Jan. 29, 1963   T. F. SARAH   3,075,721
RATCHET PAWL SILENCER FOR FISHING REEL
Filed Aug. 23, 1960   2 Sheets-Sheet 2

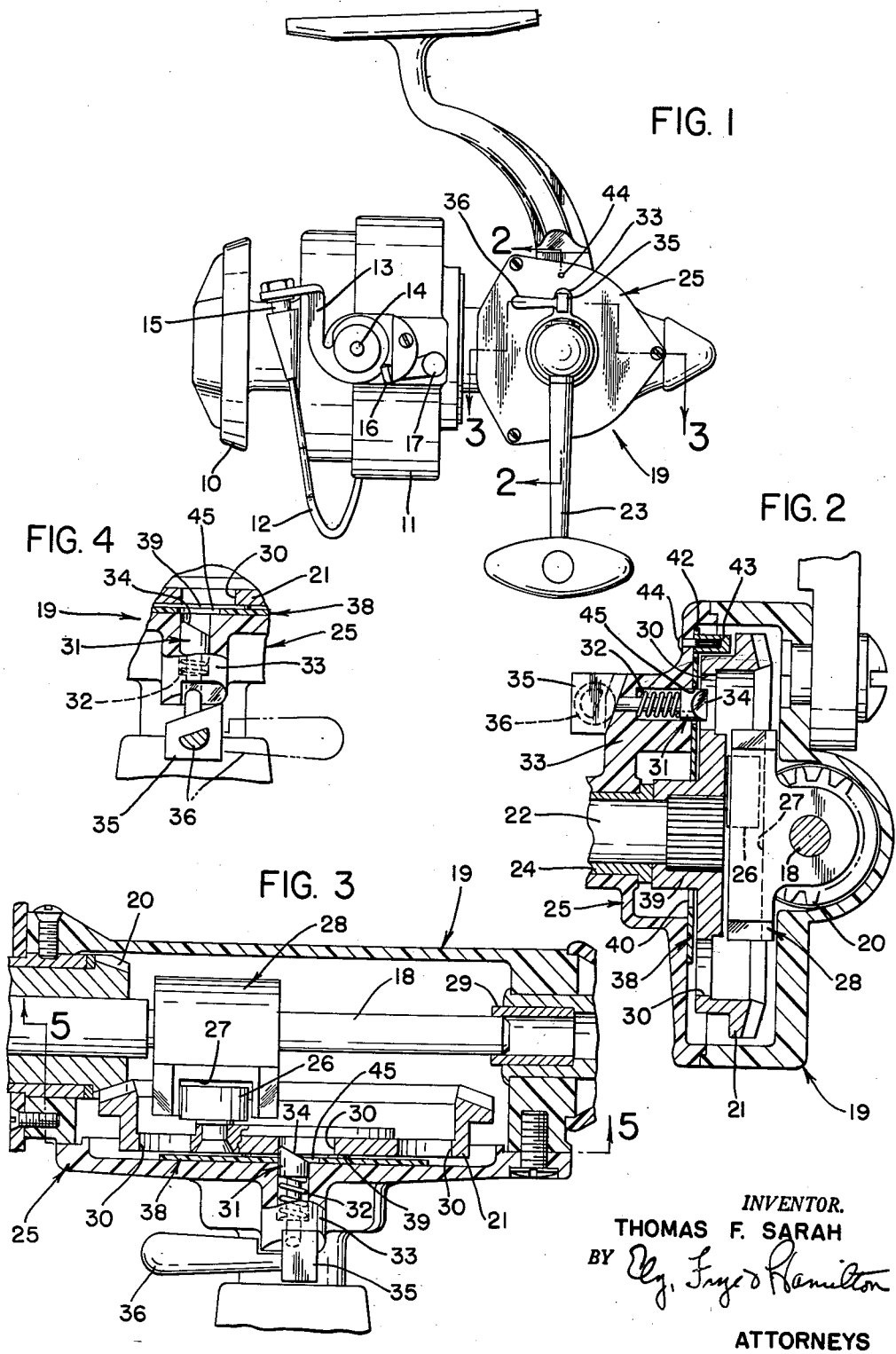

INVENTOR.
THOMAS F. SARAH
BY
ATTORNEYS

United States Patent Office 3,075,721
Patented Jan. 29, 1963

3,075,721
RATCHET PAWL SILENCER FOR FISHING REEL
Thomas F. Sarah, Akron, Ohio, assignor to The Enterprise Manufacturing Company, Akron, Ohio, a corporation of Ohio
Filed Aug. 23, 1960, Ser. No. 51,386
7 Claims. (Cl. 242—84.2)

The invention relates generally to fishing reels, and more particularly to spinning reels having a ratchet pawl for preventing reverse movement of the winding mechanism.

Spinning reels usually have a rotating flyer with a pick-up arm or bale which guides the line onto a spool during winding, and the flyer is rotated by a drive gear.

The anti-reverse ratchet pawl is usually resiliently mounted to ratchet over a series of teeth or abutment elements on the drive gear when it is rotated by the crank handle to wind or reel in the line, and the pawl is adapted to lock into one of said teeth or abutment elements when rotation of the handle is reversed.

It is an object of the present invention to provide a novel and improved anti-reverse ratchet pawl construction in which the pawl is held disengaged from the drive gear during the winding operation so as to eliminate the noise of the pawl ratcheting over the teeth or abutment elements thereon.

Another object is to provide improved means to disengage the pawl automatically at the start of winding and to hold the pawl disengaged during winding rotation of the drive gear.

A further object is to provide improved pawl-disengaging means which is automatically re-engaged when rotation of the drive gear is reversed.

A still further object is to provide simple and inexpensive means automatically to engage and disengage the pawl during rotation of the drive gear in opposite directions, which means is easily applied to existing reel constructions.

These and other objects are accomplished by the improved parts, constructions and arrangements comprising the present invention, a preferred embodiment of which is shown by way of example in the accompanying drawings and described in detail herein. Various modifications and changes in details of construction are included within the scope of the invention as defined in the appended claims.

Referring to the drawings:

FIG. 1 is a side elevation of a spinning reel embodying the present invention, the pick-up bale being shown in position to wind the line on the spool.

FIG. 2 is an enlarged fragmentary sectional view through the drive gear, taken on line 2—2 of FIG. 1.

FIG. 3 is an enlarged fragmentary sectional view on line 3—3 of FIG. 1.

FIG. 4 is a partial view similar to FIG. 3 showing the ratchet pawl moved to disengaged position.

Figure 5:
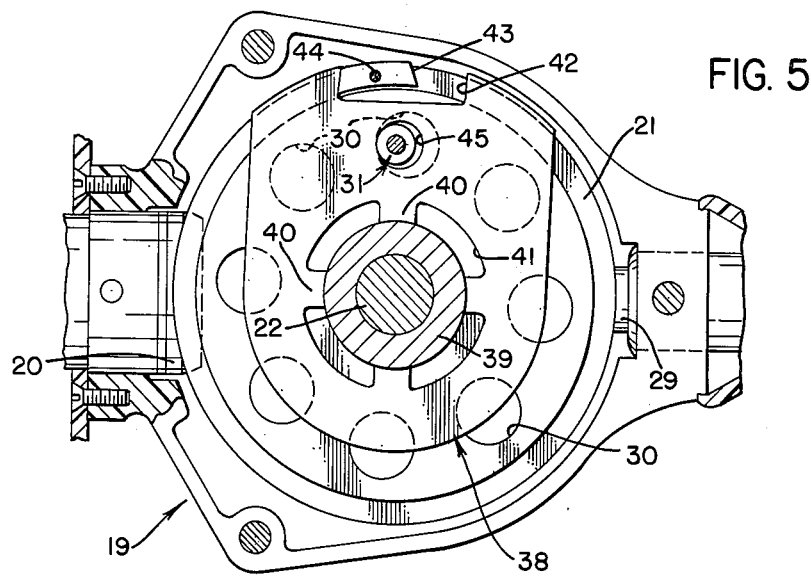
FIG. 5 is a sectional view on line 5—5 of FIG. 3, showing in plan elevation the novel plate for automatically disengaging the pawl, and the pawl projecting through the plate to engage the drive gear.

The spinning reel shown in FIG. 1 has a spool 10 on which the line is wound and a rotating flyer 11 which telescopes over the spool. The bale or pick-up arm 12 is pivoted on the flyer for swinging over the spool, and one end of the bale is connected to a bracket arm 13 pivoted at 14 on the flyer. The bale has a line guide grooved roller 15 therein adjacent to the bracket arm for guiding the line onto the spool when the bale is in winding position.

A spring-biased latch 16 engages notches on the bracket arm selectively to hold the bale in the winding or casting position, and spring means (not shown) is provided for yieldingly urging the bale to winding position when the latch is tripped. This position is shown n FIG. 1. The latch is pivoted at 17 on the flyer 11, and suitable mechanism is provided within the flyer for automatically tripping the latch at the start of the winding operation.

The spool 10 is non-rotatively mounted on a shaft 18 (FIGS. 2 and 3) extending into the gear housing 19, and a bevel pinion 20 journaled on shaft 18 is connected to the flyer for rotating the same. The pinion 20 meshes with the drive gear 21 within housing 19, and the drive gear 21 is keyed on a drive shaft 22, the outer end of which has mounted thereon the crank handle 23 for turning the drive gear to rotate the flyer 11. The shaft 22 is preferably journaled in a sleeve bushing 24 in the cover 25 for the gear housing.

In order to reciprocate the shaft 18 axially to move the spool 10 in and out of the flyer as the flyer rotates for the purpose of level-winding the line on the spool, a roller 26 eccentrically mounted on the ring gear 21 is rotatably received in the slot 27 of a yoke 28 secured on shaft 18. The end of shaft 18 is axially slidable in a bushing 29 in the housing. The parts thus far described are typical of spinning reels such as shown in my prior Patent No. 2,713,463, and per se form no part of the present invention.

The drive gear is provided with a circular series of abutment elements, in this case holes 30, adapted selectively to engage a ratchet pawl 31 which is urged or biased into the holes by a spring 32 surrounding the reduced shank of the pawl and abutting an annular shoulder within the boss 33 on the cover 25. Obviously, a series of teeth could be substituted for holes 30, and the teeth could be located on the periphery of the drive gear 21.

The inner end of the pawl is beveled at 34 so that as the drive gear is rotated counter clockwise, as viewed in FIG. 1, the beveled surface 34 will cam or ratchet over the successive holes, while engagement of the side of the pawl in any one of the holes prevents reverse rotation.

Figure 7:
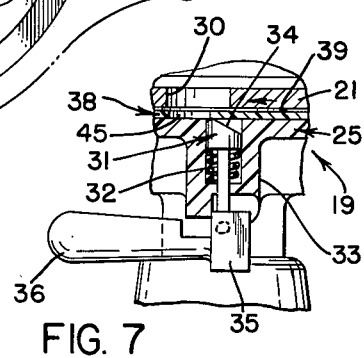
FIG. 7 is a fragmentary sectional view on line 7—7 of FIG. 6.

As shown in FIGS. 2, 3 and 7, the shank of pawl 31 may project through the boss 33, and a cam block 35 may be secured to the outer end of the shank with an arm 36 extending angularly therefrom for rotating the shank through approximately 180°. The outer surface of the boss 33 and the inner surface of the cam block 35 may have inclined surfaces adapted to mate when the pawl is in the inwardly biased position of FIG. 3 where it engages into the holes 30 of the gear 21. When the arm is rotated toward the position shown in phantom in FIG. 4, as it reaches the full-line position the inclined surface of the pawl cams over the inclined surface of the boss and retracts the pawl out of engagement with the drive gear.

This construction enables the fisherman to retract the pawl manually at any time if he desires to wind in or reverse rotation of the crank handle to pay out line as desired while playing a fish.

The novel means for automatically disengaging the pawl on starting to wind the line and for holding the pawl disengaged during the winding operation is adapted to operate when the pawl is in the normal inwardly biased position of FIGS. 2 and 3.

The novel pawl-disengaging means comprises a plate 38 surrounding the hub 39 of the drive gear 21, and interposed between the gear and the adjacent inner surface of the housing cover 25. The plate may be of thin plastic material or sheet metal, and is adapted to fit the hub 39 with sufficient friction to turn with the hub unless restrained by positive stop means. As shown, the plate is of plastic material having lugs 40 extending radially inward from an enlarged opening 41 surrounding the hub, the lugs frictionally contacting the hub so as to turn with it unless the plate is held from turning.

The plate 38 is preferably extended radially outward on one side beyond the adjacent outer periphery of the gear 21, and the outer edge portion of the extension is provided with a circumferential notch 42 in which is located a stop lug 43 fastened to the cover plate by a pin 44. The extension of the plate is also provided with a hole 45 for registering with the ratchet pawl 31.

Figure 6:
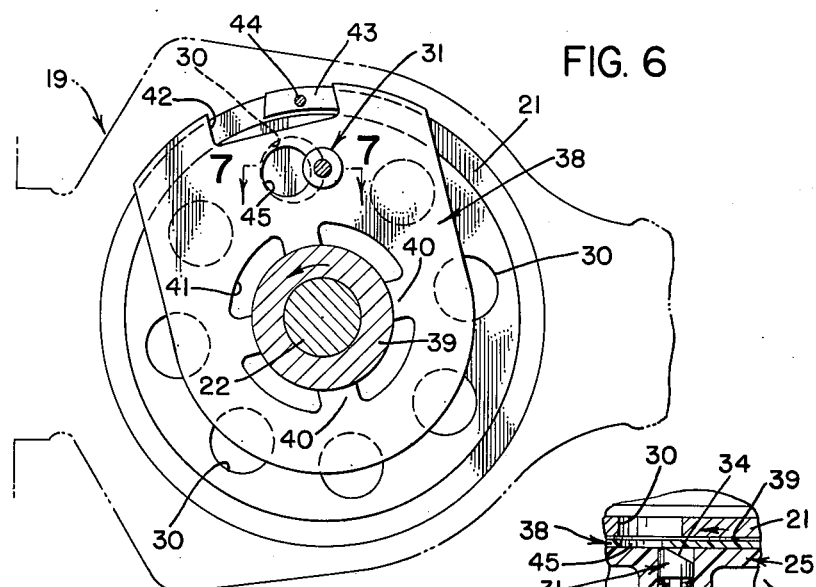
FIG. 6 is a similar view showing the plate in position disengaging the pawl.
Figure 8:
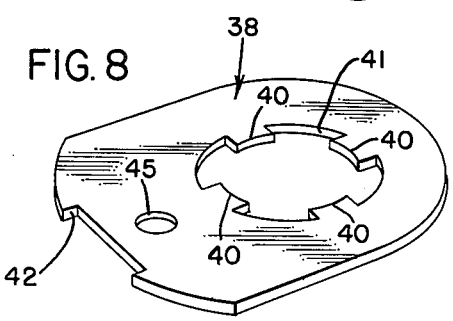
FIG. 8 is a detached perspective view of the novel pawl-disengaging plate.

In the operation of the novel pawl-disengaging plate, assume that the pawl 31 is in the position of FIGS. 2 and 3, in which the pawl extends through the hole 45 in the plate 38 for engaging the holes 30 in the gear 21. Now, if the gear 21 is turned counter clockwise to wind in the line, the plate 38 will start to turn with the gear due to the frictional engagement of the lugs 40 on the gear hub. As the gear turns, the pawl 31 will first be cammed or ratcheted out of the registering holes 45 and 30 by the edges of the holes sliding over the bevel 34, and then the hole 45 will slide under the pawl to hold it out of engagement with the gear 21, as seen in FIGS. 6 and 7. In this position, the stop lug 43 engages or abuts the end of notch 42 and prevents further rotation of the plate 38. Thus the gear 21 may continue to rotate during the entire winding operation without any noise from the pawl clicking into and out of the holes 30.

When rotation of the gear 21 is reversed, the plate 38 turns clockwise with the gear until the hole 45 registers with pawl 31, at which time the stop lug 44 abuts the opposite end of notch 42, as shown in FIG. 5, and the pawl is in position to engage and lock into the first hole 30 which comes along, thereby preventing further reverse rotation of the gear 21.

Thus, the novel plate provides means to disengage the pawl automatically at the start of the winding operation and to re-engage the pawl when rotation of the drive gear is reversed. The plate provides simple and inexpensive pawl disengaging and silencing means which is easily applied to various existing reel constructions.

What is claimed is:

1. In a spinning reel having a spool, a flyer rotatable around said spool for winding a line thereon, and a drive gear for rotating said flyer, a series of abutment elements on said drive gear, a spring-biased ratchet pawl movable at right angles to the plane of said gear to lock into any of said elements in one direction of rotation of said gear and to resiliently ratchet thereover in the opposite direction of rotation, a plate interposed between said gear and said pawl and frictionally engaging said gear normally to rotate therewith, said plate normally holding said pawl disengaged from said elements and having a hole registrable and engageable with said pawl when the plate is rotated in said one direction, and means to limit rotation of said plate with said gear in either direction.

2. In a spinning reel having a spool, a flyer rotatable around said spool for winding a line thereon, and a drive gear for rotating said flyer, a series of abutment elements on said drive gear, a ratchet pawl adapted to lock into any of said elements in one direction of rotation of said gear and to resiliently ratchet thereover in the opposite direction of rotation, a plate interposed between said gear and said pawl and frictionally engaging said gear normally to rotate therewith, said plate normally holding said pawl disengaged from said elements and having a hole registrable and engageable with said pawl when the plate is rotated in said one direction and means to limit rotation of said plate in one direction to register said hole with said pawl and in the opposite direction to hold said hole out of register, said plate when rotated in said opposite direction adapted to cam said pawl out of said hole.

3. In a spinning reel having a spool, a flyer rotatable around said spool for winding a line thereon, and a drive gear for rotating said flyer, a series of abutment elements on said drive gear, a housing for said drive gear, a ratchet pawl movably mounted in said housing to lock into any of said elements in one direction of rotation of said gear and to ratchet thereover in the opposite direction of rotation, a plate interposed between said gear and said housing and having a hole registrable and engageable with said pawl to pass said pawl therethrough when the pawl is rotated in said one direction, said plate normally holding said pawl disengaged from said elements and frictionally engaging said gear normally to rotate therewith, and means on said housing to engage said plate for limiting rotation thereof in either direction.

4. In a spinning reel having a spool, a flyer rotatable around said spool for winding a line thereon, and a drive gear for rotating said flyer, a series of abutment elements on said drive gear, a housing for said drive gear, a ratchet pawl movably mounted in said housing at right angles to the plane of said gear to lock into any of said elements in one direction of rotation of said gear and to ratchet thereover in the opposite direction of rotation, a plate interposed between said gear and said housing and having a hole registrable and engageable with said pawl to pass said pawl therethrough when the pawl is rotated in said one direction, said plate normally holding said pawl disengaged from said elements and frictionally engaging said gear normally to rotate therewith, and means on said housing to limit rotation of said plate in one direction to register said hole with said pawl and in the opposite direction to hold said hole out of register, said plate when rotated in said opposite direction adapted to cam said pawl out of said hole.

5. In a spinning reel having a spool, a flyer rotatable around said spool for winding a line thereon, and a drive gear for rotating said flyer, said drive gear having a hub, a series of abutment elements on said drive gear, a spring-biased ratchet pawl movable at right angles to the plane of said gear to lock into any of said elements in one direction of rotation of said gear and to resiliently ratchet thereover in the opposite direction of rotation, a plate interposed between said gear and said pawl and frictionally fitting said gear hub normally to rotate therewith, said plate normally holding said pawl disengaged from said elements and having a hole registrable and engageable with said pawl when the plate is rotated in said one direction, and means to limit rotation of said plate with said gear in either direction.

6. In a spinning reel having a spool, a flyer rotatable around said spool for winding a line thereon, and a drive gear for rotating said flyer, said drive gear having a hub, a series of abutment elements on said drive gear, a ratchet pawl adapted to lock into any of said elements in one direction of rotation of said gear and to resiliently ratchet thereover in the opposite direction of rotation, a plate interposed between said gear and said pawl and frictionally fitting said gear hub normally to rotate therewith, said plate having a hole registrable and engageable with said pawl, and means to limit rotation of said plate in one direction to register said hole with said pawl to pass said pawl therethrough and in the opposite direction to hold said hole out of register, said plate when rotated in said opposite direction adapted to cam said pawl out of said hole.

7. In a spinning reel having a spool, a flyer rotatable around said spool for winding a line thereon, and a drive gear for rotating said flyer, a series of abutment elements on said drive gear, a housing for said drive gear, a ratchet pawl movably mounted in said housing to lock into any of said elements in one direction of rotation of said gear and to ratchet thereover in the opposite direction of rotation, a plate interposed between said gear and said housing and having a hole registrable and engageable with said pawl, said plate frictionally engaging said gear normally to rotate therewith, a stop on said housing, and spaced abutments on said plate selectively to engage said stop to register said hole with said pawl to pass said pawl therethrough in one direction of rotation of said plate and to hold said hole out of register in the opposite direction of rotation.

References Cited in the file of this patent

UNITED STATES PATENTS

| | | |
|---|---|---|
| 876,752 | Waldron | Jan. 14, 1908 |
| 2,079,106 | Cirac et al. | May 4, 1937 |
| 2,354,530 | McMahon | July 25, 1944 |
| 2,974,895 | Wood | Mar. 14, 1961 |

FOREIGN PATENTS

| | | |
|---|---|---|
| 737,191 | Great Britain | Sept. 21, 1955 |

OTHER REFERENCES

Lehman: German application 1,073,794, printed Jan. 21, 1960 (Kl. 45h 89/00), 2 pp. spec., 1 sheet dwg.